(12) United States Patent
Steinmeyer et al.

(10) Patent No.: US 12,545,600 B2
(45) Date of Patent: Feb. 10, 2026

(54) MOBILE LIGHT PROCESSING SYSTEM

(71) Applicant: Focal Technologies, Inc., Portland, OR (US)

(72) Inventors: Donald Alan Steinmeyer, Silverdale, WA (US); Eric Robert Steinmeyer, Portland, OR (US); Charles Austen Angell, West Linn, OR (US); Andy Rukliss, LaCenter, WA (US); John Richard Zagelow, Portland, OR (US)

(73) Assignee: Focal Technologies, Inc., Portland, OR (US)

( * ) Notice: Subject to any disclaimer, the term of this patent is extended or adjusted under 35 U.S.C. 154(b) by 427 days.

(21) Appl. No.: 17/964,836

(22) Filed: Oct. 12, 2022

(65) Prior Publication Data

US 2023/0278893 A1   Sep. 7, 2023

Related U.S. Application Data

(60) Provisional application No. 63/415,579, filed on Oct. 12, 2022, provisional application No. 63/254,798, filed on Oct. 12, 2021.

(51) Int. Cl.
| | |
|---|---|
| *C02F 1/30* | (2023.01) |
| *C02F 1/72* | (2023.01) |
| *G02B 19/00* | (2006.01) |
| *C02F 101/30* | (2006.01) |

(52) U.S. Cl.
CPC ............ *C02F 1/30* (2013.01); *G02B 19/0009* (2013.01); *G02B 19/0042* (2013.01); *C02F 1/725* (2013.01); *C02F 2101/30* (2013.01); *C02F 2201/008* (2013.01); *C02F 2305/10* (2013.01)

(58) Field of Classification Search
CPC ........ C02F 1/30; C02F 1/725; C02F 2101/30; C02F 2201/008; C02F 2305/10; G02B 19/0009; G02B 19/0042

See application file for complete search history.

(56) References Cited

U.S. PATENT DOCUMENTS

| | | |
|---|---|---|
| 4,240,210 A | 12/1980 | Huang |
| 4,440,155 A | 4/1984 | Maloof et al. |
| 4,549,528 A | 10/1985 | Gibson |

(Continued)

OTHER PUBLICATIONS

The International Bureau of Wipo, International Preliminary Report on Patentability regarding PCT Patent Application No. PCT/US2022/046488, dated Apr. 25, 2024, 5 pages.

(Continued)

*Primary Examiner* — Nicole M Ippolito
(74) *Attorney, Agent, or Firm* — Kolisch Hartwell, P.C.

(57) ABSTRACT

A mobile system for treatment of a fluid containing organic material using sunlight may provide a trailer and a fluid treatment system mounted on the trailer. The fluid treatment system may include a solar tracking subsystem coupled to the trailer, a lens support mounted on the trailer and controlled by the solar tracking subsystem, a refracting lens coupled to the lens support, and a receiver mounted on the trailer. The receiver may be positioned with respect to the refracting lens to receive substantial concentrated light energy from the sunlight passing through the refracting lens. The fluid may be routed through the receiver for treatment of the organic material with concentrated sunlight.

9 Claims, 10 Drawing Sheets

(56) References Cited

U.S. PATENT DOCUMENTS

| | | | |
|---|---|---|---|
| 5,043,080 | A | 8/1991 | Cater et al. |
| 5,439,652 | A | 8/1995 | Sczechowski et al. |
| 6,037,289 | A | 3/2000 | Chopin et al. |
| 6,468,434 | B2 | 10/2002 | Pappa et al. |
| 6,557,804 | B1 | 5/2003 | Carroll |
| 7,628,017 | B2 | 12/2009 | Montesinos |
| 7,884,279 | B2 | 2/2011 | Dold et al. |
| 8,042,337 | B2 | 10/2011 | Hong |
| 8,101,896 | B2 | 1/2012 | Alenizi |
| 8,104,465 | B2 | 1/2012 | Kribus et al. |
| 9,201,228 | B1 | 12/2015 | Steinmeyer et al. |
| 9,490,384 | B1 | 11/2016 | Strahm |
| 2012/0085387 | A1 | 4/2012 | French, Sr. |
| 2014/0137925 | A1 | 5/2014 | Boyk |
| 2016/0380577 | A1* | 12/2016 | Polk ........................ H02S 30/20 136/246 |
| 2021/0181453 | A1* | 6/2021 | Zolnowski ............. G02B 7/021 |

OTHER PUBLICATIONS

U.S. Receiveing Office of WIPO, International Search Report and Written Opinion regarding PCT Patent Application No. PCT/US2022/046488, dated Jan. 31, 2023, 9 pages.

\* cited by examiner

MOBILE LIGHT PROCESSING SYSTEM

CROSS-REFERENCES TO PRIORITY APPLICATIONS

This application is based upon and claims the benefit under 35 U.S.C. § 119(e) of U.S. Provisional Patent Application Ser. No. 63/254,798, filed Oct. 12, 2021, and U.S. Provisional Patent Application Ser. No. 63/415,579, filed Oct. 12, 2022. The complete disclosures of each application are hereby incorporated by reference in their entireties for all purposes.

BACKGROUND

Highly concentrated solar energy has many advantages for application to industrial processes and for environmental remediation. These processes typically utilize concentrated thermal and UV energy. In the environmental remediation field, the solar spectrum has been shown to be effective in processes such as decontamination, at both low and high concentrations.

A two-axis-tracking solar concentrator may use circular refracting optics optimized for industrial, agricultural, and emergency management applications or for environmental remediation. Example of such concentrators are shown in U.S. Pat. Nos. 9,201,228 and 9,435,989, the entireties of which are incorporated by reference herein for all purposes.

A solar concentrator may refract available sunlight through a large acrylic refracting lens designed to optimize the concentration of the UV specific wavelengths. Concentration ratios of up to 500:1 are achievable with circular refracting optics operating on a solar source. Using a typical solar energy of 1,000 W/meter$^2$ as an example, such concentrator may deliver energy to a receiver area at 250:1 concentration with an average temperature of 800° F. and up to approximately 7,000 W/meter$^2$ of UV energy, depending on the relative position of the receiver to the lens. These values have been described as order of magnitudes greater than UV lamps and may be produced using technology described in the above-noted patents.

The optical design of a concentration lens in the solar concentrator provides an optimum spectrum distribution within the receiver and reduces lens losses. The cone shape of the concentrating lens provides accurate geometry, and structural strength such that it will maintain the optical performance under gravity and wind loads. The concentration lens may be at least 8-ft in diameter and larger concentrating lenses are achievable to meet the optical requirements. An acrylic material may be selected for fabrication of the lens with a broader UV transmission spectrum than other materials, while still retaining long life. Such a lens may provide highly concentrated broad spectrum UV not available by other means. The broad spectrum allows decontamination by destruction equal to and exceeding that achieved with photocatalytic activation.

BRIEF SUMMARY

A solar concentrator capable of tracking may be incorporated in a mobile light processing system for environmental remediation. The solar concentrator may be mounted on a chassis that is configured either as a standalone vehicle or a trailer. Such system may be transported to a locale where, e.g., waste water is desired to be decontaminated by destruction of organic material in the waste water.

The mobile light processing system may provide for concentrating the heat and UV energy of the sun for the purpose of breaking down organic compounds and sterilizing bacteria-laden fluids, such as water. The system may be configured either for single-pass operation, where waste water passes through the light processing portion of the system one time, or multi-pass operation, where water may by routed through the light processing portion multiple times. As an example for single-pass, the system may provide at least about 99% sterilization of E-*Coli* bacteria and may deliver a 30% reduction on a variety of organic effluents with a high biological oxygen demand (BOD). A multi-pass system may provide improved sterilization and reduction as compared to the single-pass.

The solar concentrator in the system may include a lens configured to focus the sun's power into a reaction chamber or other type of receiver, typically through a front window made of a suitable material such as borosilicate. When the required water conditions in the receiver have been reached (water temperature, dwell time, etc.), a supply pump is turned on to pump raw water into the receiver and the processed water in the receiver leaves the system.

The system may use a medium of titanium dioxide or other catalytic metals, such as iridium oxide, in the receiver to convert some of the UV energy from the solar concentrator into a small electric charge, which has an acceleration effect over the natural rate of UV degradation. On some effluents, the system may also reach the thermal breakdown point of the effluent, further accelerating the material degradation. This UV catalyzed reaction in addition to the UV exposure plus the sterilization effect of the heat delivered with the UV from the visible solar wavelength provides the three mechanisms that degrade effluents that are fed through the system.

The use of concentrated UV for the photocatalytic destruction of organics represents a whole new avenue of environmental remediation that may be employed to solve environmental challenges alone or in concert with existing remediation strategies for a more complete result. The use of concentrated solar energy may also reduce the temperature required to degrade most organic compounds and the heat provided may speed up photocatalytic reactions. Embodiments of the present disclosure deliver both heat and UV creating an energy delivery for improved environmental remediation.

DETAILED DESCRIPTION

Figure 1:
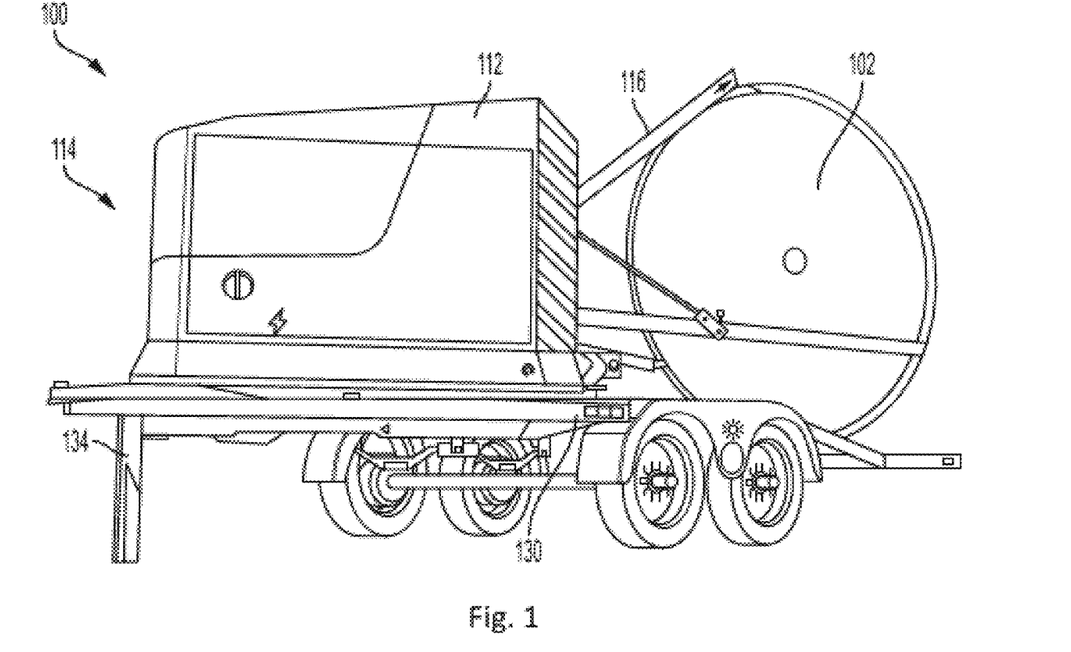
FIG. 1 is a perspective view of a mobile light processing system mounted on a wheeled trailer and with the trailer hitch supported by a stand to fix the position and orientation of the system, and with a solar concentrator in a deployed configuration.
Figure 2:
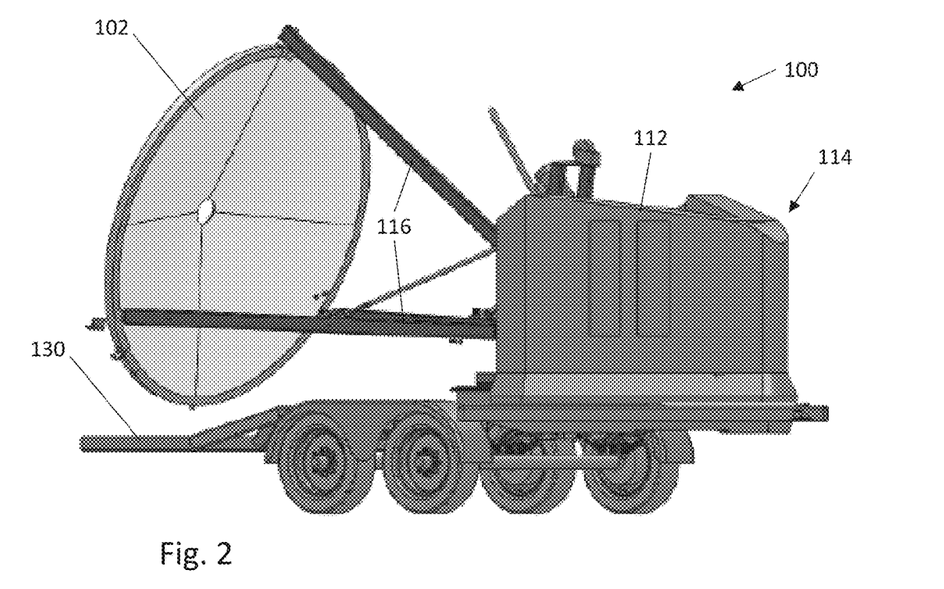
FIG. 2 is a perspective view of a system similar to that of FIG. 1, with additional instrumentation in view.
Figure 3:
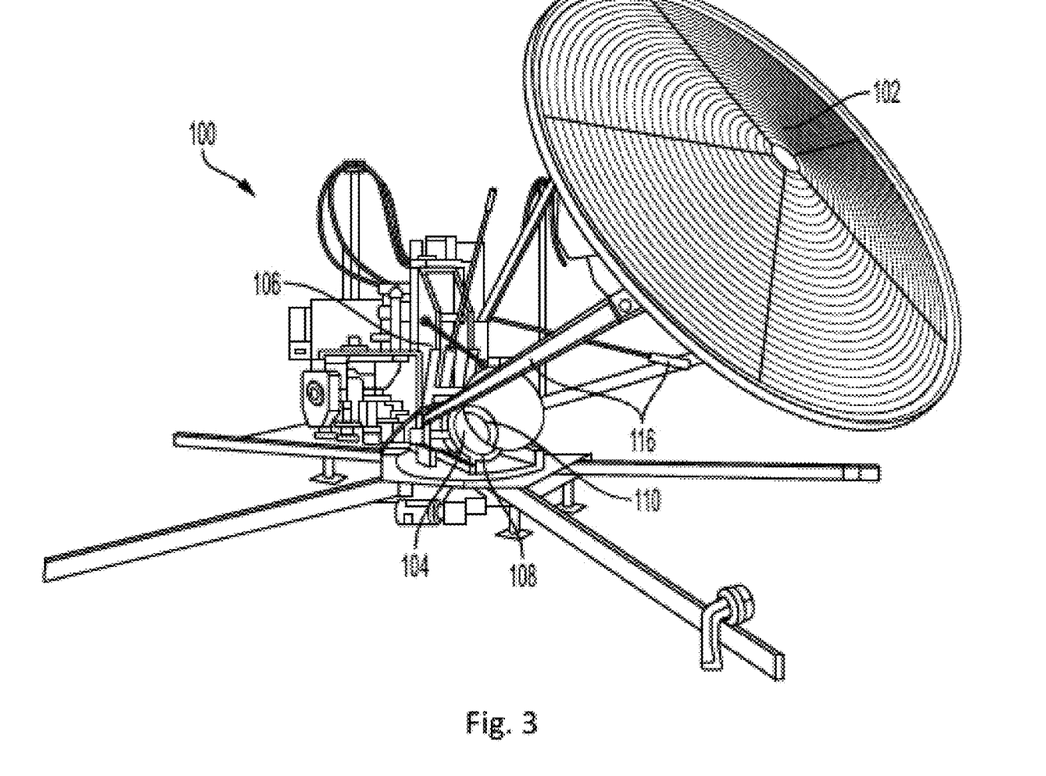
FIG. 3 is a perspective view of a light processing system similar to that of FIGS. 1 and 2, in this case dismounted from the chassis.
Figures 6, 7, 8:
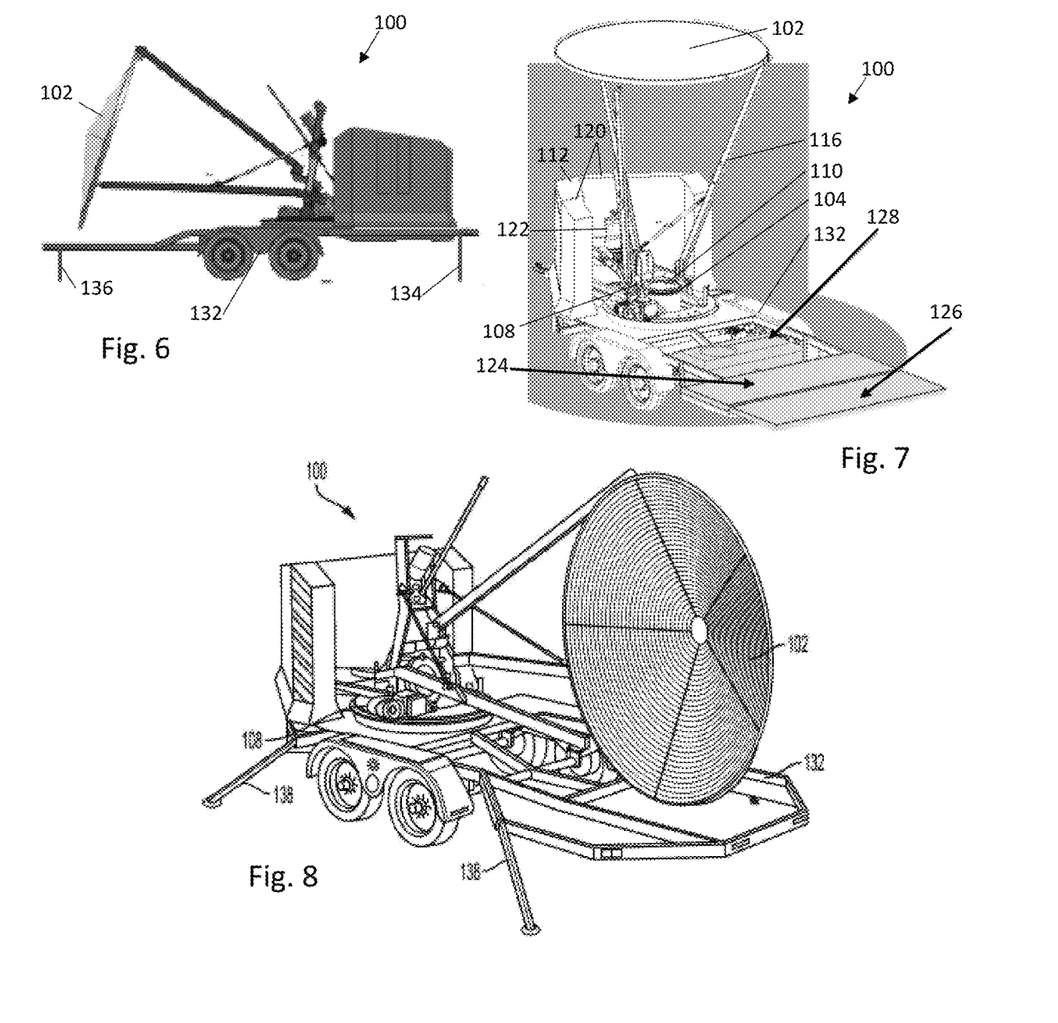
FIG. 6 is a side view of the light processing system of FIGS. 1-5 with the solar concentrator deployed and the trailer stabilized fore and aft with stands.
FIG. 7 is a perspective view of the light processing systems of FIGS. 1-6 with the solar concentrator deployed and tracking an overhead sun and showing solar panels and an inverter for providing standalone power to the system, e.g., to power the tracking instrumentation, electronics, and motors.
FIG. 8 is a perspective view of the light processing systems of FIGS. 1-7 with a set of stabilizing legs coupled to the chassis and grounded to stabilize the system in fixed position and orientation.
Figure 9:
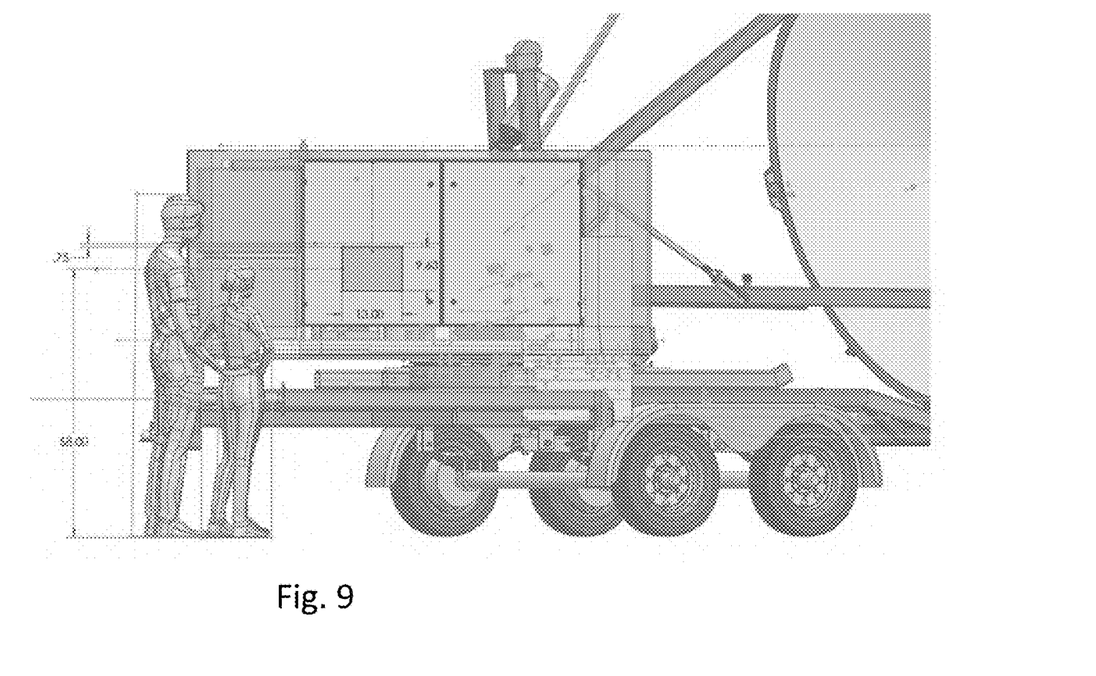
FIG. 9 is a side view of an embodiment of the light processing system, including an interface panel for use by one or more operators.
Figure 10:
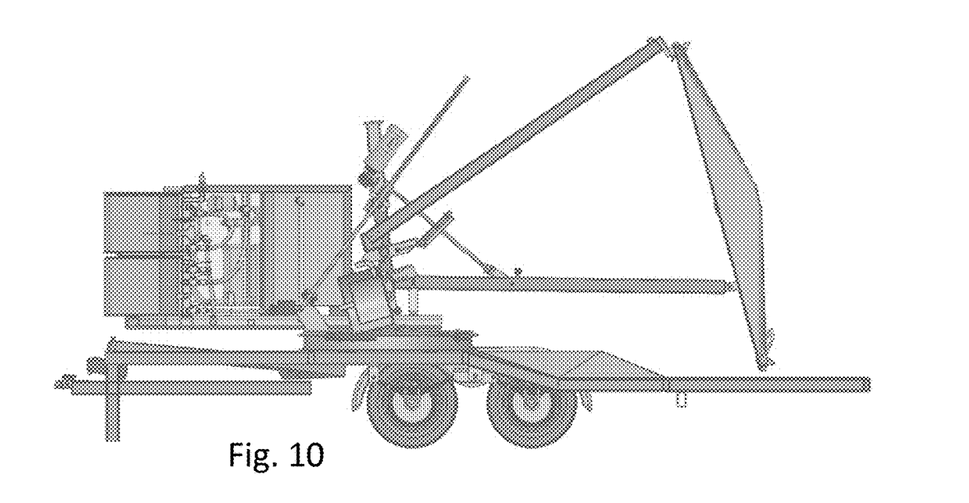
FIG. 10 is a side cross-sectional view of the light processing system, the cross-section taken through the midline of the receiver.
Figure 11:
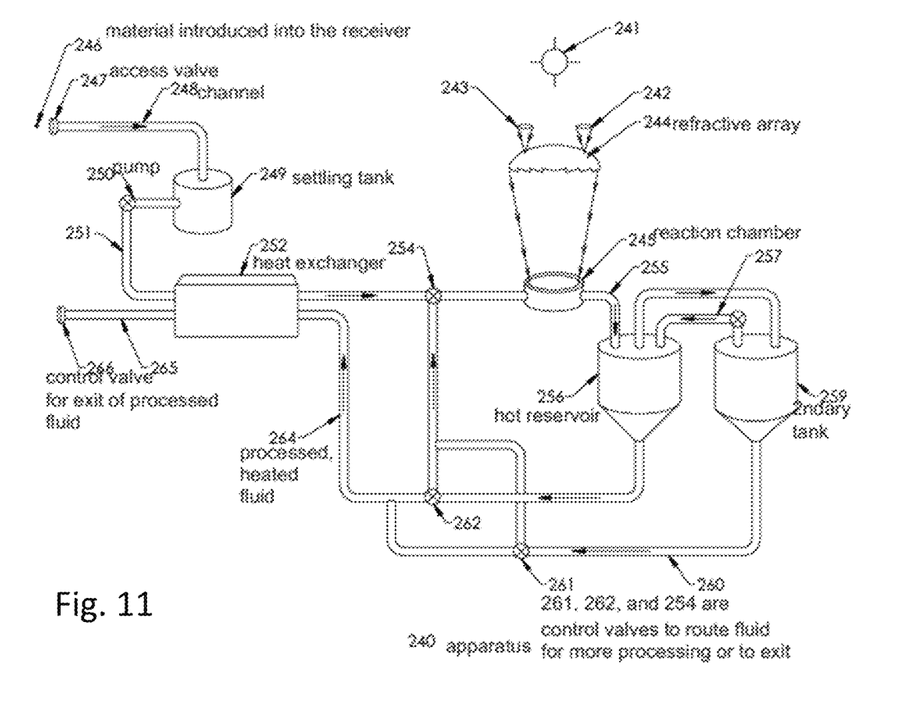
FIG. 11 is a flow diagram for the light processing system.
Figure 12:
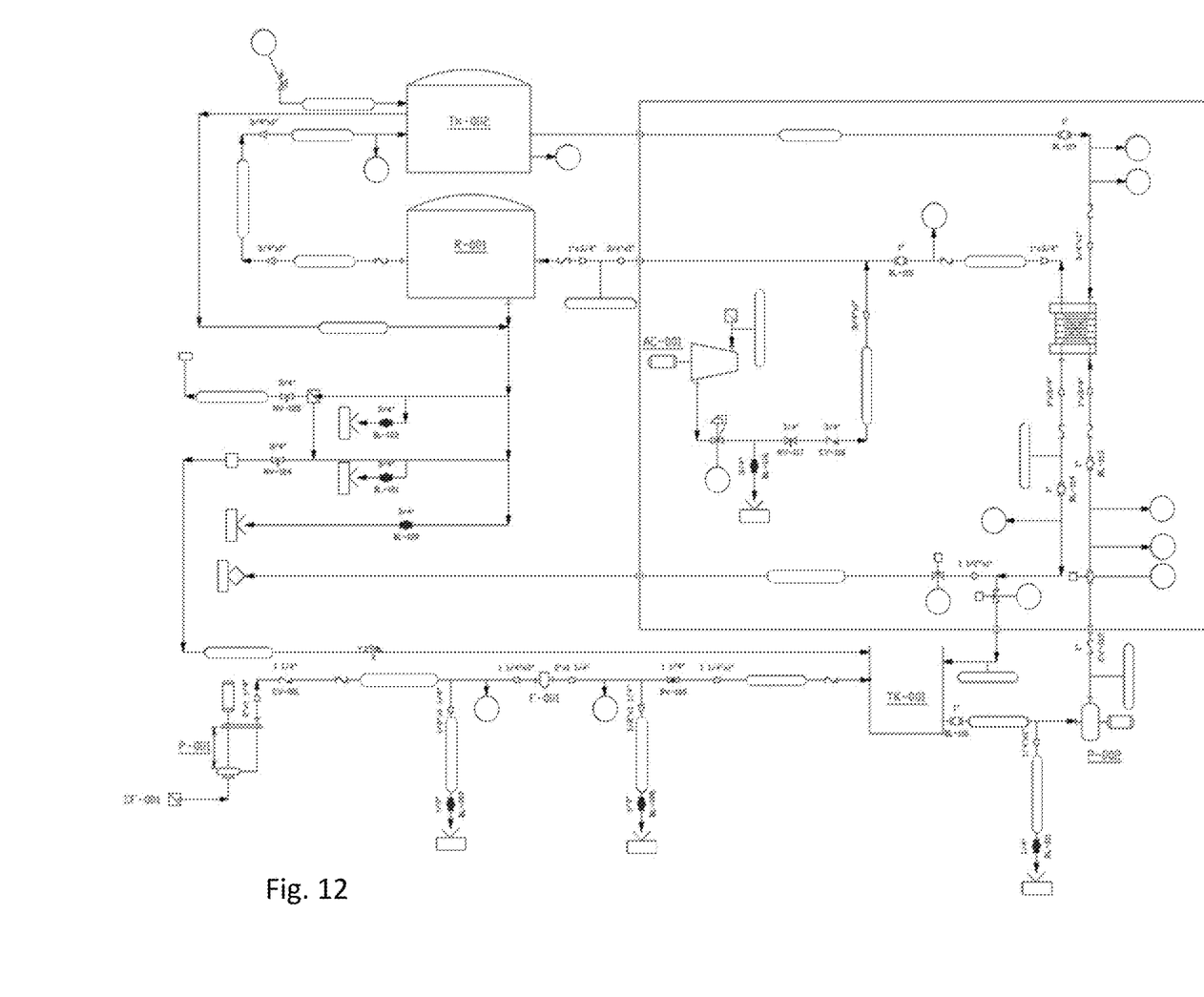
FIG. 12 is a flow diagram for another embodiment of the light processing system.
Figure 13:
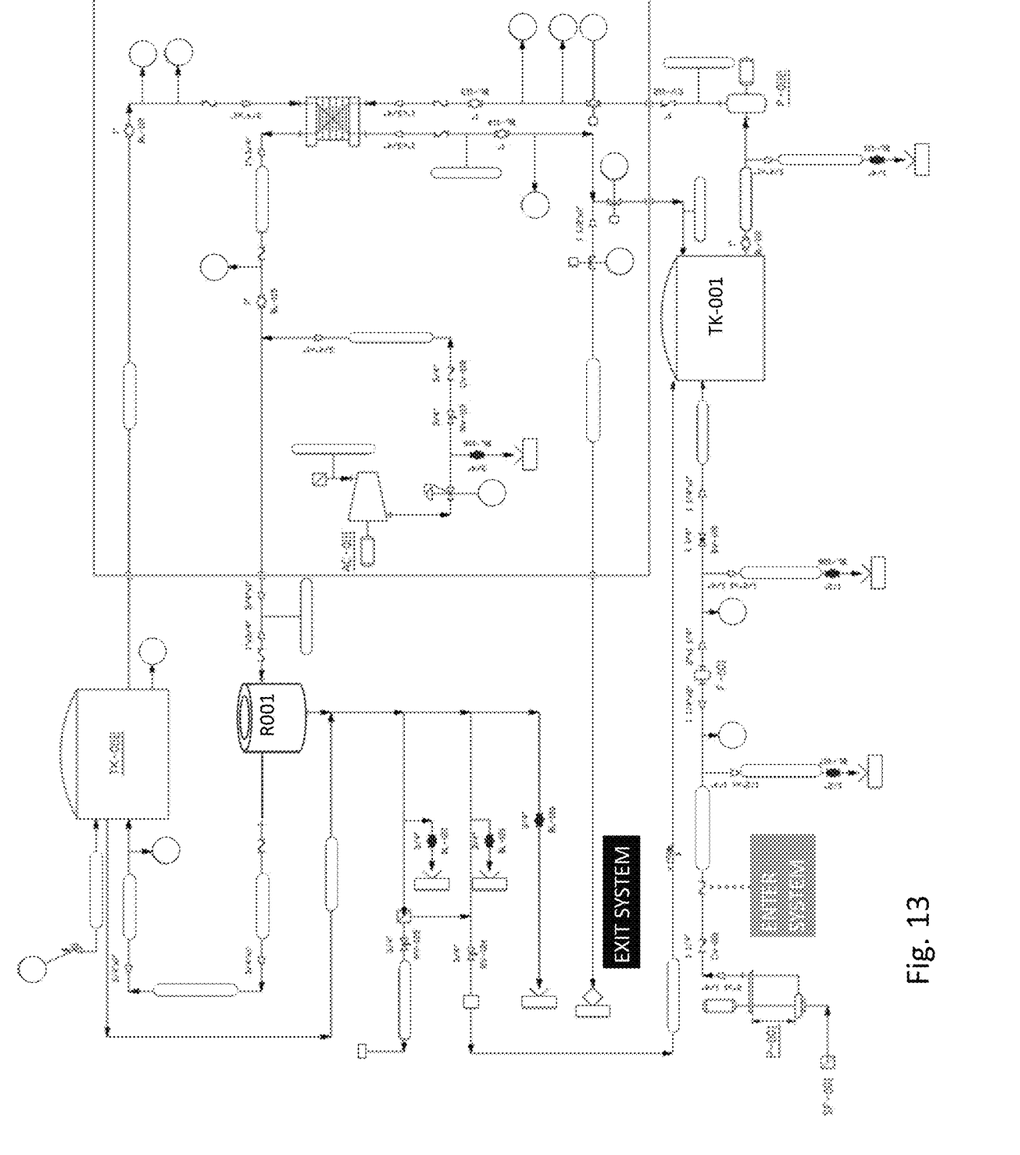
FIG. 13 is a flow diagram for another embodiment of the light processing system.

A system 100, as shown in the figures and according to embodiments of the present disclosure, may include a large refracting lens 102 that may be fabricated from cast acrylic. Such lens may be, for example, slightly more than ¼ inches thick. The lens is typically a minimum of about 8 feet in diameter and may be made up of any suitable number of facet surfaces to refract the light available to the outer surface of the lens, concentrating the resulting beam, and directing it to a receiver 104 (FIGS. 3, 4, and 7) where effluent may be exposed and processed. As one example only, a lens may include 97 or more facet surfaces created from casting. The casting environment may be improved by reducing the number of facets, by increasing the depth of individual facets, and by increasing the "F" number of the lens, where the "F" number is defined as the ration of lens diameter to the length from the lens linear place to the focal plane. The number of facet surfaces may be about 80 or about 50 or fewer.

Receiver 104 may incorporate any of a number of insert designs where a structure may be inserted into the receiver for processing of a particular fluid. The structure may have any geometry as best suited to a particular application for the receiver and may be coated or otherwise provided with a substrate for photocatalysis of a fluid that will be passed though the receiver. The receiver may be provided with a structure, and the various inserts maybe provided with complementary structure, that provides for a modular design where the receiver may accept a variety of inserts, each of which provides a unique structure and geometry with a substrate capable of supporting a photocatalysis purposed coating, such as the spiral structure as described in U.S. Pat. No. 9,201,228. Such substrate may be designed to expose the attached catalyst to the concentrated UV to process the material passing through the receiver. The geometry and structure of the insert may be designed to control flow of the effluent and to maximize the effluent exposure to both the UV and the activated catalyst.

Lens 102 may be of a convex shape to increase the refraction capability of the facets. Lens 102 may be manufactured and engineered to specifications required of solar operating systems installed at national laboratories. Lens 102 may be weather proof and a may have a quoted material life of 20 years. Lens 102 may have a higher hail resistance than glass. Lens 102 may also be designed to withstand wind gusts up to 120 MPH, and may be operational, for example for the mobile structure, in wind up to 35 MPH. The other structure in system 100 may also be designed and built to handle such wind loads.

Lens 102 may follow the sun through the use of a solar tracking subsystem 106. Any suitable subsystem may be used, e.g., the solar tracking equipment provided by Heliotrack of Bellvue, Colo. solar tracking subsystem 106 may sense when solar light is available and may direct the lens to a position to be centered on the sun. Solar tracking subsystem 106 may sense when light is entering the receiver using at least one Programmable Logic Controller (PLC). Solar tracking subsystem 106 may, through a series of PLC's, direct a motorized subsystem 108 of system 100 to point lens 102 at the sun and center the focused beam from lens 102 on a quartz receiver cover 110. During cloudy conditions, when the sun is not available, solar tracking susbsystem may continue to move lens 102 to track the sun using a memory function that directs lens 102 to the likely solar position based upon latitude and time of day. Electronics for subsystems 106, 108 may be housed in one or more electrical panels in a control housing 112 at a portion 114 of system 100. The electrical panels may be UL rated. As will be further described below, portion 114 may be located in a forward portion of a trailer used for moving system 100 from location to location.

Lens 102 may be mounted on a support subsystem, such as three-armed support 116 that may be coupled to solar tracking subsystem 106. The movement of support 116 and lens 102 may be directed by two primary drive elements, an azimuth drive and an elevation drive. Azimuth or side to side rotation may be accomplished through the use of any suitable motor, e.g., a small 1/2 hp motor that may be connected through a gear reducer to a rotational gear plate. For example, a Boston Gear Reducer made under the brand Grove Gear by the Regal Beloit Corporation of Beloit, Wisconsin may be used and may be coupled from the motor to a large rotational gear plate to allow for a slow movement of support 116 and lens 102. The gear plate may be stainless steel and may be protected by an exterior housing.

The support subsystem may include an A-frame section that may hold lens arms 116 and the A-frame section may provide an elevation pivot point for the support subsystem and allow for movement of the receiver element to maintain optimal focal position to capture the energy from the lens. Movement at the elevation pivot point may be driven by a motor coupled to a ball screw, e.g., a 1/3 HP motor may be coupled to a 3-ton capacity ball screw sold under the brand Duff Norton by the Columbus McKinnon Company of Getzville, N.Y. Activation of this ball screw may vertically position the three lens arms and lens 102 to the desired height to be in direct orientation with the sun. The positioning provided by the motor, ball screw, and pivot point may be controlled by solar tracking subsystem 106.

Control housing 112 is typically situated opposite lens 102, which may be positioned on a rear (as oriented on the trailer) portion 118 of system 100. Control housing 112 may include, e.g., two 30" high X 60" long X 10" deep control panels. Control housing 112 may house one or more heat exchange elements as well as electrical panels for operating solar tracking subsystem 106 and control valves for routing water being processed in system 100. Control housing 112 may include two panels 120 forming a V shape with a vertically aligned holding tank 122 positioned between them at the narrow end of the V. One panel 120 may hold the electrical power and control equipment, including the positioner and its integral controller, motor control circuits, all power circuits and the main PLC's, which directs the fluid and temperature control actions of system 100.

The other panel 120 may house the PLC or programmable board elements for the directional control systems, the safety systems, the water system components including: the temperature control valve, heat exchangers, two solenoid valves which allow switching from processing to recirculation mode, and the air compressor system.

System 100 may carry one or more safety systems. A first safety system may be operational to detect a fault in the alignment of lens 102 to the sun or an electrical failure, in which case the may be unable to maintain alignment as the sun moves west. That may cause lens 102 to not direct the sun precisely to the receiver. In such case, the first safety system may cause the pump motors and temperature controller flow systems to stop operating.

A second safety system may, in the event of, for example, a power failure or a low battery event, cause a battery powered shutter mechanism to immediately deploy to cover the receiver. The shutter mechanism may include a heat resistant reflective material that is designed to withstand the exposure temperature of the solar image. The inside of the shutter is an insulated ion material to help maintain the operating temperature inside the fluid-processing portions of system.

A third safety system, for example, a PLC in the control box, may direct the screw or ball jack to lower the lens to move down to its lowest possible position, again using battery power. This will prevent the lens from concentrating light onto any part of the system or the trailer.

A shroud attached to the lens arms from the lens down will prevent the image from exposing anything other than the inside of the unit. The third safety system may be operational in the event of an electrical failure, failure of one of the pumps (which could lead to overheating the water in the receiver,) or any element of the fluid control system, any interruption of available effluent to be fed into the system or any failure of the position control system.

System 100 may include a data collection system that can feed and store operating data to a local or remote server, which may be controlled and monitored by a system operator. Each system 1000 may be programmed with a code that can be uploaded using an app from a handheld device. In the event of a failure, that software app may alert a user and/or the system operator to a system fault. System 100 may remain in stand-by dormant mode until it is reactivated manually following a restart procedure, which may be found in an operational manual.

Either or both of electrical panels 120 may include a touch screen that displays the analytics and operational status of system 100. Using a selectable option, such as a toggle feature, the user may be directed to a series of displays that may be used to control the temperature and operational functions of system 100.

System 100 may also include a power supply, e.g., a 20-amp, 110-volt AC power supply for system operation. System 100 may be equipped with an optional subsystem, which allows for remote monitoring of system 100 and may also provide real time status alerts. Suitable subsystems include the Ewon devices available from HMS Networks Inc. of Chicago, Illinois.

System 100 may include an onboard solar photo voltaic (PV) power subsystem 124 to power system 100, e.g., in remote locations. Solar power subsystem 124 may be sized to provide the power requirement of system 100, e.g., 20 amps at 110-volts AC. Solar power subsystem 124 may include a main solar panel 126 and a fold-out solar panel 128. Solar power subsystem 124 may also include an inverter and a battery backup subsystem 130.

System 100 may be mounted on a trailer 132. Trailer 132 may be provided with one or more stabilizer legs and/or jacks such as front leg 134, rear leg 136, and/or side legs 138.

Figure 4:
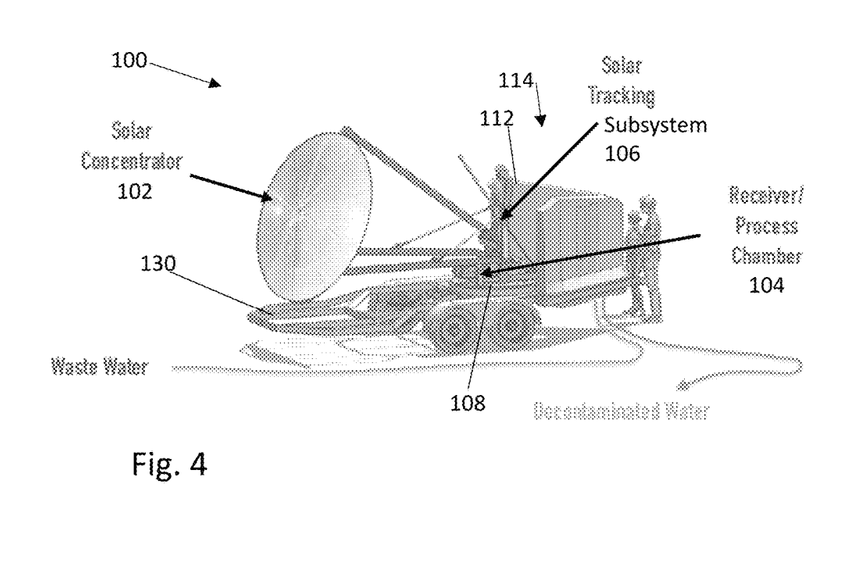
FIG. 4 is another perspective view of a light-processing system as in FIGS. 1-3 showing the couplings for waste water to flow into the system and decontaminated water to flow out of the system.
Figure 5:
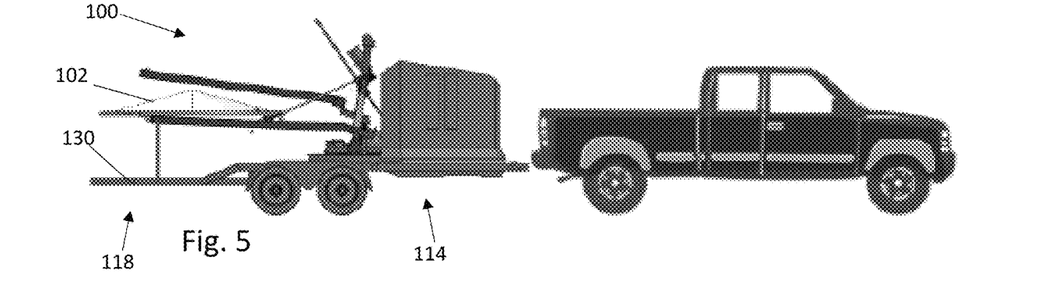
FIG. 5 is a side view of the light processing system of FIGS. 1-4 showing the solar concentrator in a stowed configuration and with the trailer hitched to a vehicle for transport.

As best seen in FIG. 4, a fluid material, such as waste water, may enter system 100 through a draw pump that may flow into a water head filter, for example, a filter with a one-micron rating or another rating as best suited to the particular filtration requirements. This separates out large particulates and protects the other elements of the system 100. The effluent may be pumped through a series of high efficiency heat exchangers that may provide a nominal 3 to 4-degree delta F approach. The heat exchangers may be located in control housing 120 and may be easily accessed and replaced if necessary.

Once through the heat exchangers, the effluent flows into the main processing environment of receiver 104. A variable speed pump system may direct the effluent to the primary receiver exposure area. The speed of this flow may be adjusted to maintain a minimum process temperature using a thermocouple sensor and a controller which may adjust a throttling ball valve by an amount determined by control sensors that measure the operating temperature of the fluid in system 100. The treated water leaving the holding tank may be maintained at a minimum internal operating temperature. Preferably the fluid in system 100 is maintained above 155 degrees F. during processing operation.

Receiver 104 may be a stainless-steel vessel with a capacity of just over 6-gallons. Inside, receiver 104 may include a series of baffles that direct the flow of the effluent to the areas that will provide maximum exposure to the delivered energy and the surface of the titanium dioxide catalyst insert in the receiver. The baffles provide for a substantial portion up to 100% of the effluent entering the receiver to be exposed to the delivered energy. The sun's energy may enter receiver 104 through quartz cover 110, which may, for example, provide a window that is about 15½ inches in diameter and about ¾ inches thick or larger. Window 110 may be affixed to a hatch subsystem that may allow receiver 104 to be easily opened for cleaning and maintenance but also allows for a water tight seal when properly closed.

For example, the receiver insert may be provided with a geometry to maximize the energy capture. The receiver insert may provide a surface for infusing the UV activated photocatalysts, and the surface may be black or another suitable dark color for stimulating heat transfer into the receiver cavity. The surface geometry may provide surface area for interaction with refracted solar rays entering the receiver. A perforated surface may be used, with openings to allow flow through the insert, and to allow the solar radiation to penetrate the full cavity of the receiver, while providing sufficient surface area for the catalysts coating to contact the fluid transiting through the receiver. A metal, such as aluminum, may used for the insert. Expanded aluminum may provide a useful surface and the expanded metal may formed at an angle to the initial plane.

Figure 14:
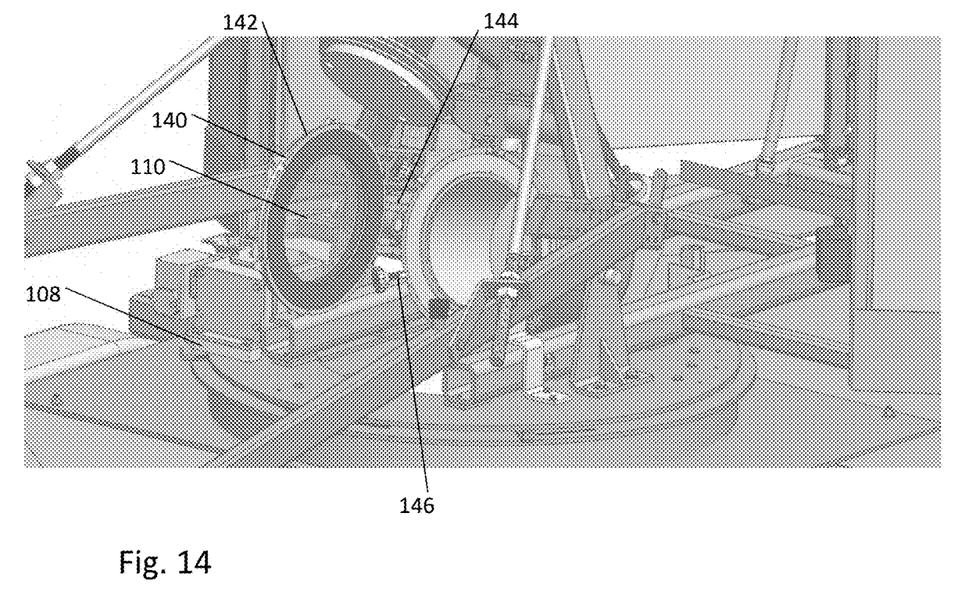
FIG. 14 is a perspective view of the light processing system in particular the receiver with an open hatch.
Figures 15, 16:
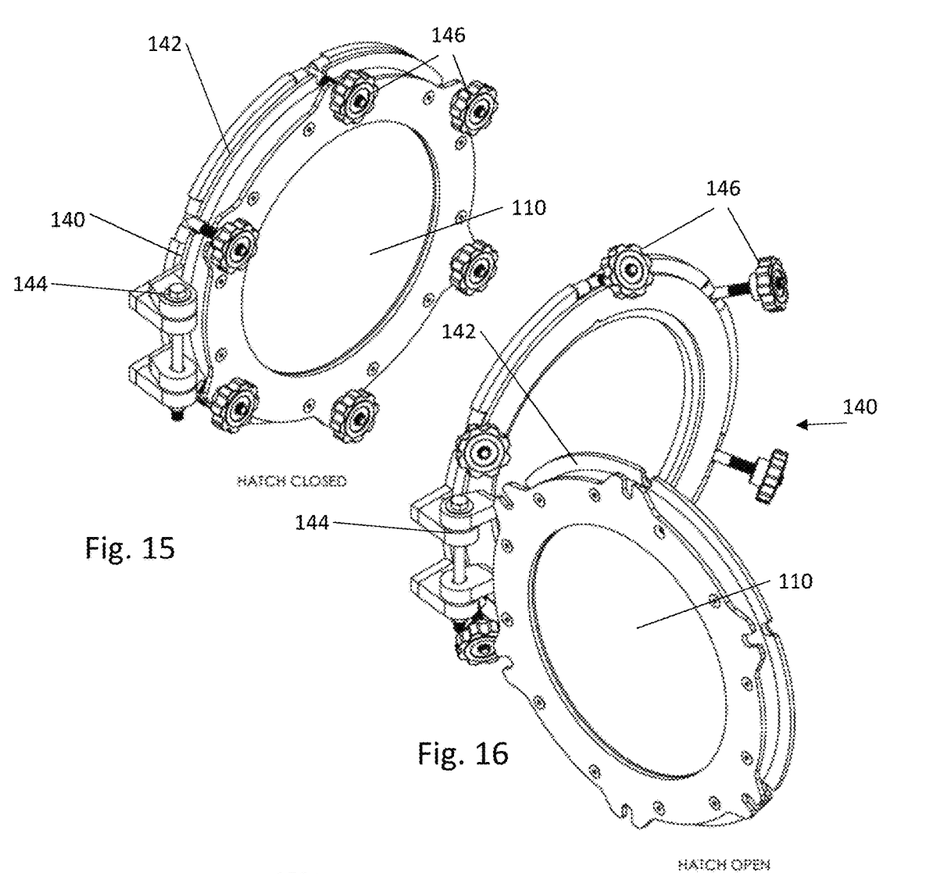
FIG. 15 is a detail view of the hatch in a closed position.
FIG. 16 is a detail view of the hatch in an open position.

A hatch subsystem 140 is illustrated in FIGS. 14, 15, and 16, where window 110 may be installed in an annular ring 142 of hatch subsystem 140. Ring 142 may be attached by a hinge 144 or similar structure to receiver 104 and may be secured in place when in a closed position by a fastening structure such as clamps 146. Closing hatch subsystem 140 seals up receiver 104, which may assist in retaining heat within receiver 104 both during operation and in non-operational periods, e.g., overnight.

Figure 17:
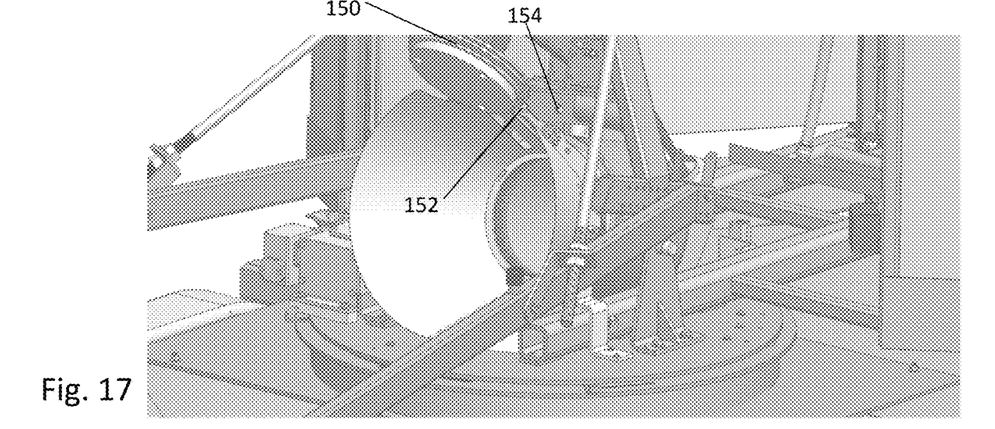
FIG. 17 is a perspective view of the light processing system in particular the receiver with the hatch in the closed position.
Figure 18:
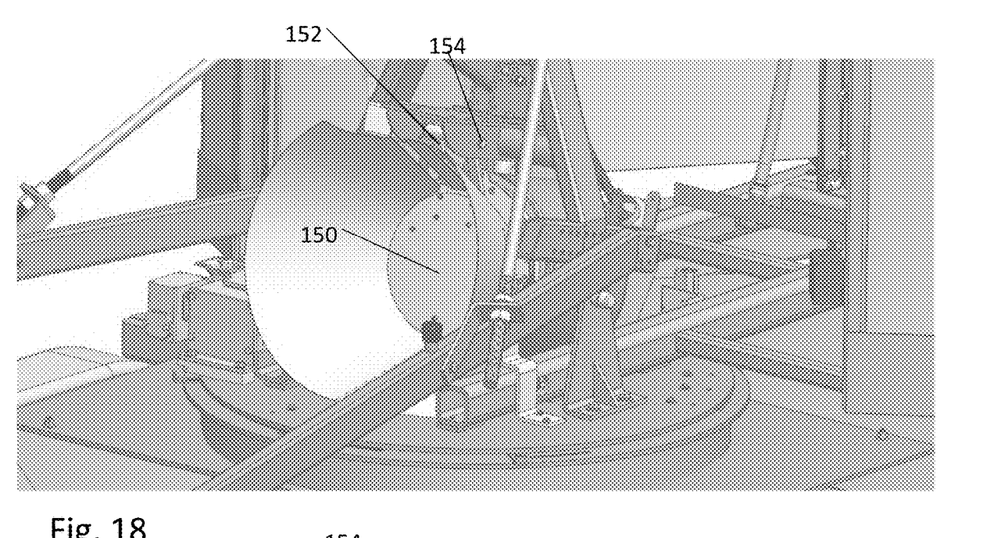
FIG. 18 is a perspective view of the light processing system in particular the receiver with both the hatch and the shutter in a closed position.
Figure 19:
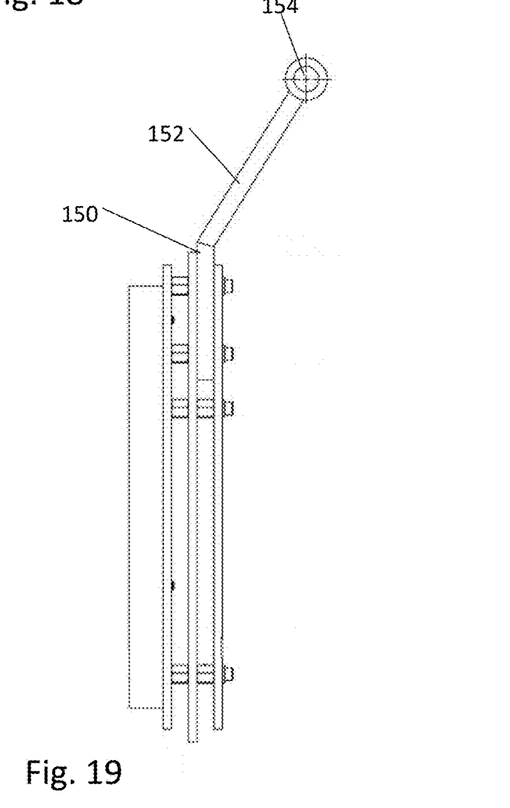
FIG. 19 is a side detail view of the shutter.

A shutter subsystem 150 is illustrated in FIGS. 17, 18, and 19, which may be configured to provide a light-opaque cover over the hatch and the receiver. Shutter subsystem 150 may provide for temperature regulation of the hatch and receiver in various situations. For example, shutter subsystem 150 may include a shutter plate 152 mounted by an arm 152 to a hinged connection 154 adjacent receiver 104. As shown in FIG. 17, the shutter may be in an open position during normal operation of system 100. The shutter may be closed, as illustrated in FIG. 18, during other modes, such as shutdown or overnight, or if the system detects a condition, such as a failure mode, where the receiver should not be exposed to light.

As fluid exits receiver 104, it has been exposed to the primary remediation mechanisms and is mostly treated. A vapor control subsystem may be attached just above an outlet of the receiver, which may control gas build up. The vapor control subsystem may allow for any liquid vapor to be collected and fed back into system 100. The vapor control subsystem may also provide for a gas collection port that allows methane or any other natural carbon that is released by the material degradation to be collected and separated. A gas venting and collection system may provide for directing all methane and other greenhouse gas into a collection port for carbon emission reduction and post treatment processing.

Once the effluent has left the receiver, it may be fed into an onboard 21-gallon storage tank This tank may collect and hold the effluents to allow for a desired residence time for effluents to be held at processing temperature. This time period is variable based upon the speed of operation, but in most cases the time an effluent spends inside of the primary processing area of the receiver is 6 minutes. The tank design volume may be based on a 3-minute residence time at 7-GPM.

Temperature sensors may be provided inside the collection tank for determining if the treated effluent is above a minimum internal operating temperature, e.g., 155 degrees F. If the effluent is below that minimum temperature, the intake pump may shut off and the processing internal pump may recirculate the water through the system until it reaches the control desired temperature. A 1 KW small heating element may be provided inside the holding tank receiver to help boost the sun heat load temperature in nominal conditions and to keep the fluids inside system 100 warm overnight to allow for immediate start up in the morning to maximize operational up time.

If the effluent is at the desired temperature, it may be discharged by sending it back through the heat exchanger elements. This cools the water to within 3 to 4 degrees of the original temperature of the source water by and transferring that heat to the incoming water, warming it up to within 3 to 4 degrees of the discharge water temperature internal operating temperature. A series of flow meters in the control cabinet is used to monitor the process flow rate. At this point, the effluent can be discharged, or collected for secondary process verification or additional treatment.

Trailer 132 used for system 100 may for example be about 8.5 feet wide and about 21 feet long and weigh about 1,000 pounds and have a load capacity of about 7,000 pounds to accommodate the total weight of system 100. Typically the total weight of system 100 is approximately 3,700 pounds. Trailer 132 may be legal for vehicular transport and may contain all required light systems and meet all road requirements. Trailer 132 typically includes an electrical hookup and a ball for coupling to a towing vehicle's hitch.

One or more support legs/jacks may be integrated into trailer 132, such as front leg/jack 134, rear leg/jack 136 and side legs/jacks 138, any or all of which may be adjustable in length to level trailer 132 on uneven ground. When trailer 132 is disconnected from a vehicle, the support legs/jacks may be deployed from the trailer. These may be connected to stainless steel feet via a jack system. This allows the unit to be leveled and it allows for the safe, stable deployments of system 100.

Operating Conditions:

System 100 performance may vary depending on the ambient conditions of operation and the concentration and specific make-up of the effluent being fed into the receiver. The level of discharge and the specific flow rate may be determined by local requirement or specific permit language relative to the intended use.

The embodiments disclosed herein include a system mounted to a wheeled trailer, and it will be understood that different configurations for a trailer may be used as best suited to a particular application and intended environment for the system and trailer.

Hatch: open portal on top of the receiver cover; receiver is in an insert sleeve; hatch helps to retain heat overnight.

Below are descriptions of material subsystems and parts that may be included in one or more embodiments of system 100.

Structural:

1. Frame: The frame is fabricated from mild steel tubing which may be stainless steel or powder coated at completion for corrosion resistance. Components will be mounted using 316SS nuts and 304SS bolts for corrosion resistance and using different stainless steel to minimize galling. The frame has five equally spaced tubes which support the rotating unit, ensuring the unit cannot tip over. Components of the frame which touch the ground are stainless steel to eliminate corrosion. The frame will be mounted on a trailer.

2. Rotating lens support platform: A stainless steel round plate will slide on plastic plate bearings to rotate the plastic focusing lens assembly within the frame. The lens is mounted in a mild steel support ring which is attached and supported by three mild steel tubes. These tubes are mounted to the receiver to support and locate the lens focal point correctly. The lens is pivoted up and down using permanently lubricated bushings.

3. The standard unit is configured to facilitate shipping by removing one bolt from 4 of the base leg assemblies and rotating them to be aligned to fit on a truck. The lens assembly can be attached to a unit mounted hand winch, or a mechanized system, either of which may allow the lens to be raised and lowered and to be rotated flat for transportation. Another hand winch can be used to pull the unit onto a tilted flatbed truck. Alternately, a nylon sling can be placed under the high balancing point to allow a boom truck to lift the complete unit onto a flat-bed truck.

The unit can also be fitted with a trailer ball to facilitate easy field relocation. The unit will be trailer mounted to facilitate easy transportation at minimal cost to the end user.
Mechanical Drives:

4. A gear reducer with 1/2HP AC motor drives a pinion which mates to the final drive teeth on the rotation plate. The gear reducer will be relocated from the stationary frame to the rotation plate with the output shaft oriented down. The stainless-steel top frame plate will have internal gearing cut to prevent rust points created by the tooth contact wear and to provide better gear shielding. The lens assembly is raised and lowered using a screw jack with 3/4HP AC motor drive.
Treatment:

5. A cylindrical SS receiver with clear quartz glass cover is the treatment chamber. The lens focused ultraviolet rays and heat through the glass cover into the water to break down the contaminants. It is mounted on the rotating platform and aligned with the lens at a specified focal length. To increase destruction efficiency, the focal length has been reduced to provide a larger image on the quartz plate. A commercial tracker is used to position the lens to align with the sun.

6. A recirculating system water pump delivers contaminated water to the unit; then through heat exchangers, a ½" throttling ball control valve to maintain the treatment temperature (a thermocouple in the receiver outlet piping monitors water temperature and inputs the ball valve control), then through the receiver into a SS holding tank where treatment is completed, then through the clean side of the heat exchangers to a discharge hose.

7. A small oil free air compressor will be used to supply air to the receiver to facilitate the reaction on some applications.
Piping:

8. A pick up hose with strainer feeds the water pump with 3/4HP AC motor through a 1-micron bag filter which minimizes solid contaminates in the treatment system. A 1/2 horse power (HP) submersible pond pump will supply the dirty water to a sump on the rotating platform. The 1/2 HP recirculating system pump will also process the water from the sump through the treatment system.

9. Very efficient stainless heat exchangers heat the incoming dirty water to near the selected treatment temperature and cool the discharge water to acceptable discharge temperature. The heat from the sun heats the water to the treatment temperature and makes up the system heat losses. The Ray System is designed for approximately 7-GPM maximum flow.

10. Hoses are high temperature silicone for temperature and chemical resistance. Piping may be Schedule 40 one-inch diameter, for example, or another diameter as suited to the particular application, and may use 304SS threaded fittings and 316SS pipes for corrosion resistance and to minimize galling. Hose to pipe connections are cam lever couplings to allow easy disassembly. All piping, hoses, and components are covered with closed cell, high temperature insulation and fitted with weather resistant coverings to minimize heat loss and possibility of freezing.

11. Freeze Protection: A small recirculating pump and 1KW heater is used to protect the Ray System components from damage during freezing ambient temperatures.
Electrical:

12. A NEMA 4X electrical panel is mounted on the rotating platform to minimize wiring. The panel will be mounted at an angle on the front of the trailer with a water components panel on the other side. The processing tank will be mounted vertically between the two panels. The panel houses the tracker assembly, rotation and lift motor controls, water supply and recirculation pump controls, heater and air compressor controls, and throttling valve temperature controller. The panel has control buttons, switches and lights to control and monitor operation. The control and logic will be PLC based with a touch screen for interface and remote monitoring and troubleshooting capabilities.

13. The unit is designed to run unattended after start-up. End travel limit switches and hard stops are used to ensure the rotation and lift end positions are maintained. Motor overload protection uses breakers sized to prevent damage if hard stops are contacted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A mobile system for treatment of a fluid containing organic material using sunlight, the mobile system comprising:
   a. a trailer;
   b. a fluid treatment system mounted on the trailer, the fluid treatment system including:
      i. a solar tracking subsystem coupled to the trailer;
      ii. a lens support mounted on the trailer and controlled by the solar tracking subsystem;
      iii. a refracting lens coupled to the lens support;
      iv. a receiver mounted on the trailer and positioned with respect to the refracting lens to receive substantial concentrated light energy from the sunlight passing through the refracting lens; and
      v. a hatch subassembly attached to the receiver, the hatch subassembly selectively maneuverable between an open position and a closed position.

2. The mobile system of claim 1 further wherein the hatch subassembly is attached by a hinge to the receiver.

3. The mobile system of claim 1 further wherein the hatch subassembly includes a window.

4. The mobile system of claim 3 further wherein the window is a quartz cover.

5. The mobile system of claim 1 further wherein the hatch subassembly includes an annular ring.

6. The mobile system of claim 1 further wherein the annular ring supports a window.

7. The mobile system of claim 1 further wherein the hatch subassembly in the closed position provides a water tight seal to the receiver.

8. The mobile system of claim 1 further wherein the hatch subassembly in the open position provides an opening for cleaning the receiver.

9. The mobile system of claim 1 further wherein the hatch subassembly further includes an annular ring and at least one clamp for securing the ring in the closed position.

* * * * *